(12) United States Patent
Schaeper

(10) Patent No.: US 9,132,374 B2
(45) Date of Patent: Sep. 15, 2015

(54) PLEATED FILTER MEDIUM

(75) Inventor: Stefan Schaeper, Thandorf (DE)

(73) Assignee: CAMFIL AB, Trosa (SE)

(*) Notice: Subject to any disclaimer, the term of this patent is extended or adjusted under 35 U.S.C. 154(b) by 464 days.

(21) Appl. No.: 13/127,975

(22) PCT Filed: Nov. 24, 2008

(86) PCT No.: PCT/SE2008/051339
§ 371 (c)(1),
(2), (4) Date: Oct. 31, 2011

(87) PCT Pub. No.: WO2010/059089
PCT Pub. Date: May 27, 2010

(65) Prior Publication Data
US 2012/0037561 A1 Feb. 16, 2012

(51) Int. Cl.
*B01D 46/52* (2006.01)
*B01D 46/24* (2006.01)

(52) U.S. Cl.
CPC .......... *B01D 46/523* (2013.01); *B01D 46/2411* (2013.01); *B01D 2275/201* (2013.01)

(58) Field of Classification Search
CPC ............. B01D 29/0022; B01D 29/016; B01D 29/031; B01D 29/038; B01D 29/07; B01D 29/21; B01D 29/232; B01D 29/333; B01D 29/353; B01D 29/012; B01D 29/111; B01D 2201/12; B01D 2201/127; B01D 46/523; B01D 29/235
USPC .......... 210/493.1, 493.2, 493.3, 439.5, 497.3; 55/497, 521
See application file for complete search history.

(56) References Cited

U.S. PATENT DOCUMENTS

| 3,692,184 | A | * | 9/1972 | Miller et al. | 210/437 |
| 5,804,014 | A |   | 9/1998 | Kahler | |
| 5,888,262 | A | * | 3/1999 | Kahler | 55/497 |
| 5,954,848 | A | * | 9/1999 | Otto et al. | 55/385.3 |
| 6,165,241 | A | * | 12/2000 | Choi | 55/521 |

FOREIGN PATENT DOCUMENTS

| CA | 2312825 A1 | 6/1999 |
| EP | 0867216 A1 | 9/1998 |
| FR | 1250201 A2 | 11/1960 |

(Continued)

OTHER PUBLICATIONS

International Search Report and Written Opinion of PCT/SE2008/051339, dated Jun. 22, 2009. (Also provided as a concise reference for citation FR125021A.).

*Primary Examiner* — Benjamin Kurtz
(74) *Attorney, Agent, or Firm* — Patterson & Sheridan, LLP

(57) ABSTRACT

Pleated filter medium and filters having pleated filter medium are provided. In one embodiment, a pleated filter medium is provided having pleats with rectangular sides and a length direction parallel to the fold between the two sides of a pleat, comprising several rows of distance elements extending in a cross direction relative to the folds in the pleated filter medium The rows are distanced from each other along a length direction, whereby each row of distance elements is constituted of a line of glue elements distanced from each other and applied to a side of the filter medium. Rows of glue elements are applied to both the inside and the outside of the filter medium, the rows on the inside being displaced in the length direction in relation to the rows on the outside.

12 Claims, 2 Drawing Sheets

(56) References Cited

FOREIGN PATENT DOCUMENTS

| | | |
|---|---|---|
| FR | 1250201 A | 1/1961 |
| JP | 2004321937 A | 11/2004 |
| WO | 7900978 A1 | 11/1979 |

* cited by examiner

PLEATED FILTER MEDIUM

TECHNICAL FIELD

The present invention relates to a pleated filter medium having pleats with rectangular sides and a length direction parallel to the fold between the two sides of a pleat, comprising several rows of distance elements extending in a cross direction relative to the folds in the pleated medium, said rows being distanced from each other along a length direction, whereby each row of distance elements is constituted of a line of glue elements distanced from each other and applied to a side of the filter medium. The invention also relates to a filter using such a filter medium.

BACKGROUND OF THE INVENTION

Pleated filter media can be used for producing conical filters by being applied around end pieces having different diameters and by affixing the two free sides of end pleats to each other along the length thereof. When the length of the filter, the length direction being the axial direction of such a conical filter, reaches a certain length the pleats in the filter medium must be stabilised. One way of accomplishing such a stabilising is to glue one or more continuous cords around the periphery of the applied filter medium. The stabilising of the pleats thus requires a separate process step being made after the applying of the filter medium to the end pieces.

The objective of the present invention is a pleated filter medium which can be applied to end pieces to form a conical filter without the need for a separate stabilising step after forming of the conical filter.

SUMMARY OF THE INVENTION

This objective is accomplished by a pleated filter medium having pleats with rectangular sides and a length direction parallel to the fold between the two sides of a pleat, comprising several rows of distance elements extending in a cross direction relative to the folds in the pleated filter medium, said rows being distanced from each other along a length direction, whereby each row of distance elements is constituted of a line of glue elements distanced from each other and applied to a side of the filter medium, characterised in that rows of glue elements are applied to both the inside and the outside of the filter medium, the rows on the inside being displaced in the length direction in relation to the rows on the outside. Such a filter medium can be used to manufacture a conical filter without the need of a separate pleat stabilising step after forming of the filter.

In a preferred embodiment, the glue elements in each row of glue elements are distanced from each other in such a way that a glue element is applied to every side of a pleat, and successive rows of glue elements on the inside and the outside of the filter medium are spaced the same distance from each other in the length direction, and the rows of glue elements on the outside of the filter medium are displaced half said distance from the rows of glue elements on the inside of the filter medium.

At least one continuous glue line is preferably applied in the cross direction in one of the end portions of the filter medium.

The length of the glue elements in the cross direction is preferably 10-80% of the width of the side of the pleat.

The invention also relates to a filter, characterised by having such a pleated filter medium, the opposite ends of the filter medium being applied around the periphery of an end piece and sealingly attached thereto. One of the end pieces can have a larger diameter than the opposite end piece so that the filter has the shape of a truncated cone.

BRIEF DESCRIPTION OF THE DRAWING

The invention will now be described with reference to the enclosed figures, of which.

DESCRIPTION OF EMBODIMENTS

Figure 1:
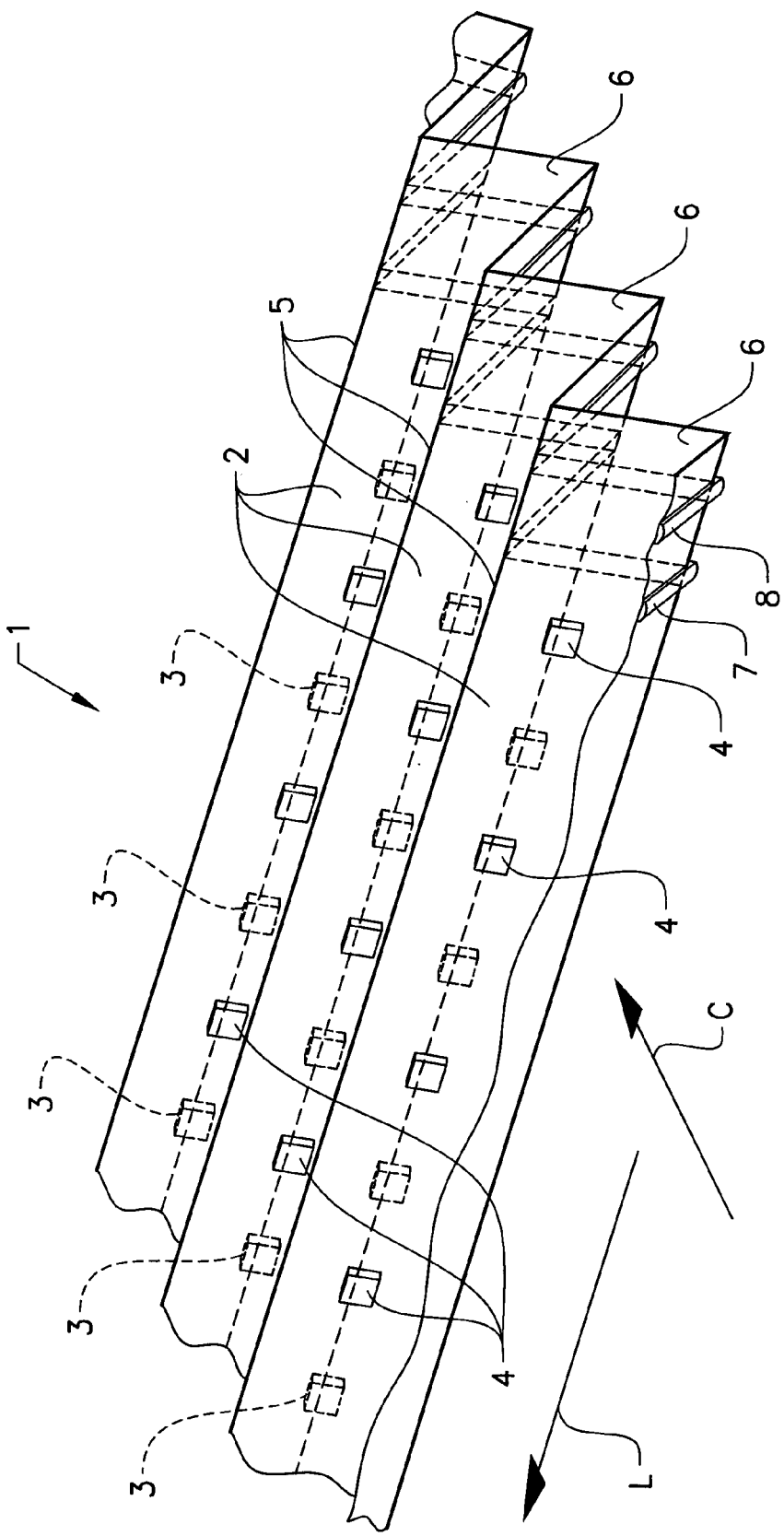
FIG. 1 schematically discloses a piece of a filter medium according to a preferred embodiment of the invention with the pleats thereof in a partly folded out, and FIG. 2 schematically discloses a filter according to the preferred embodiment.

In FIG. 1, a small piece of a pleated filter medium 1 according to a preferred embodiment of the invention is schematically shown. This piece of filter medium is shown with the pleats of the filter medium in a somewhat out-folded state compared with the end position of the pleats. In FIG. 1 only three pleats 2 are shown but a filter medium assembled in a filter contains a lot of pleats. The pleats all have the same dimensions. Furthermore, in FIG. 1 only an end portion of the filter medium 1 is disclosed. The length direction L of the filter medium 1 is parallel to the direction of the pleats 2 and the cross direction C is perpendicular thereto. The outside of the filter medium 1 is proximal to the viewer of FIG. 1 and the inside of the filter medium is distal to the viewer.

Successive rows of distance elements 3 extended in the cross direction C are applied to the inside of the filter medium 1 along the length direction L thereof. The distance elements 3 in each such row are equispaced from each other so that a distance element 3 is located on every second side of a pleat 2. The function of these distance elements 3 is mainly to prevent the sides of the pleats 2 from being pressed together by airflow during use of the filter. The distance elements 3 consist of glue spots and have preferably a thickness of 1-4 mm. The extension of each distance element 3 in the cross direction C is preferably about 10-80% of the width of a side of a pleat 2.

Successive rows of glue spots 4 extended in the cross direction C are applied to the outside of the filter medium 1 along the length direction thereof. The glue spots 4 in each such row are equispaced from each other so that a glue spot 4 is located on every second side of a pleat 2, in the shown example the spots 4 are applied to the same side of a pleat 2 as the spots 3 but on the outside thereof instead of the inside. Depending on the filter media and the glue, the glue spots may be applied on every side of the pleats.

When the filter medium 1 is produced, the pleats are accomplished by a multi-pleat machine, in which the pleats are formed and the adjacent sides of two adjacent pleats are pressed towards each other so that the pleats 2 are attached to each other by the glue spots 4 and also distanced from each other by the spots 4. The function of the glue spots 4 is mainly to stabilise the pleats 2 but the presence of spots 4 will of course reduce the risk that portions of the pleat sides will be pressed together. Also the sides of the pleats will be pressed towards each other so that these sides will be attached to each other by the glue spots 3.

The rows of glue spots 3 on the inside of the filter medium 1 and the rows of glue spots 4 on the outside are displaced in relation to each other in the length direction L so that each row of glue spots 4 in the length direction is located between two successive rows of glue spots 3. Preferably, the spots 3 and 4 are located on opposite sides of a line extending midway between the tops 5 and the troughs 6. More preferably, the spots 4 are also distanced from the top 5 of a pleat 2 by the same distance as the spots 3 are distanced from the bottom of a trough 6.

In the shown end of the filter medium 1 two continuous glue lines 7,8 are applied to the inside of the filter medium.

The filter medium 1 consists of a foldable material, preferably paper such as Glass Paper, from Sojitz Pla-Net Corporation, Tokyo, Japan, but any material used for air filters can be used. The glue used is preferably a hot melt adhesive, for example Technomelt from Henkel, Heidelberg, Germany but any other glue used for air filters can be used as well.

The distance between successive rows of glue spots 3 can be 50 mm and the distance between successive rows of glue spots 4 is the same. The displacement in the length direction between rows of glue spots 3 and rows of glow spots 4 is preferably half the distance between two successive rows of glue spots 3, i.e. 25 mm.

A filter medium 1 as described above is to be used together with end pieces to form a cylindrical or conical filter.

Figure 2:
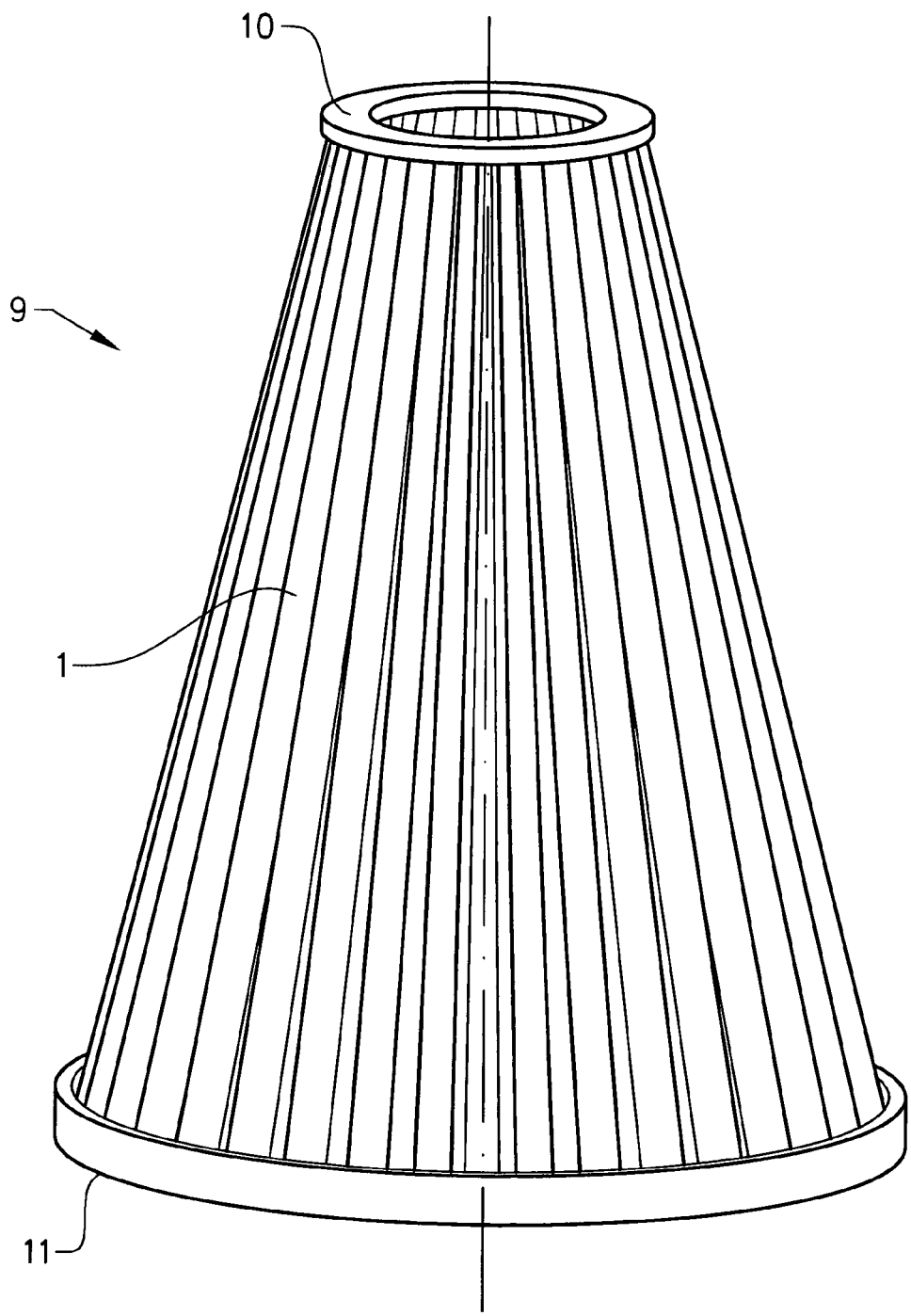

A filter 9 having the shape of a truncated cone is schematically shown in FIG. 2. Such a filter is made by wrapping the cross directional end portions of a rectangular, pleated filter medium 1 around cylindrical end pieces 10,11 and by sealingly attaching the wrapped filter medium to the end pieces 10,11 and attaching the length directional ends of the filter medium to each other along the length thereof.

As is evident from FIG. 2, the end piece 10 has a smaller diameter than end piece 11 which means that in the wrapped condition the initially rectangular pleated filter medium has taken the shape of a cut triangle. Specifically, this change in shape is accomplished by a gradual enlargement in the cross direction of the filter medium starting from the end wrapped around the end piece 10 with the smallest diameter. It is easy to realize that such an enlargement in a pleated filter medium can be obtained by gradually folding out the pleats in the length direction. However, since the pleats 2 are held together by the rows of glue spots 4 and rows of glue spots 3 such a simple folding out of the pleats is not possible in the present case. Instead, the gradual enlargement in the cross direction, i.e. the circumferential direction in the assembled filter 9 schematically shown in FIG. 2, is accomplished by gradually larger bending out of the portions of the adjacent sides of two adjacent pleats 2 lying between adjacent rows of glue spots 3 and a gradually larger bending out of the portions of the two sides of the pleats 2 lying between adjacent rows of glue spots 4 in a direction from end piece 10 towards end piece 11. The bending out of the portions of the adjacent sides of two adjacent pleats 2 lying between adjacent rows of glue spots 3 will move the glue spots 3 somewhat closer to each other also move the glue spots 4 in the cross direction and the bending out of the portions of the two sides of the pleats 2 lying between adjacent rows of glue spots 4 will move the glue spots 4 closer to each other and also the glue spots 3 in the cross direction. Therefore, the fold lines in the tops and troughs will not run in a totally straight line from the end piece 10 to end piece 11 but run in a slightly tortuous line.

With a conical filter 9 having a pleated filter medium 1 as described above it is not necessary to provide the pleats 2 with one or more continuous glue strings around the periphery of the filter medium after assembly of the filter medium onto the end pieces 10,11 in order to stabilise the pleats. Due to the rows of glue spots 3,4 a stable filter medium is obtained.

A conical filter according to the present invention will thus be much easier to manufacture than a conical filter in which the pleats have to be stabilised in a second step after assembly of the filter. The manufacturing costs of a conical filter according to the invention will thus be significantly lower than for the known filter.

The described filter medium can of course also be used for a filter having a cylindrical shape.

The described embodiment can be modified in several respects without leaving the scope of invention. The distances between the rows of glue spots can be different than described. It is also possible that the rows of glue spots applied to the outside of the filter medium are fewer than the rows of glue spots applied to the inside thereof, however the rows on the outside should still be located between rows on the inside. Furthermore, the glue spots on the outside can be displaced in the cross direction relative to the glue spots on the inside. Other materials for the filter medium than mentioned above can be used and other types of glue. It is not necessary to use the same type of glue for the rows of glue spots on the outside and inside of the filter medium even if this is preferred. The scope of invention shall therefore only be limited of the content of the enclosed patent claims.

The invention claimed is:

1. A filter comprising:
a pleated filter medium, wherein the pleated filter medium includes pleats with substantially planar, rectangular faces and a length direction parallel to a fold between the two adjacent planar faces of each pleat, and wherein the pleated filter medium includes an interior side and an exterior side, the pleated filter medium comprising:
a plurality of rows of distance elements extending in a cross direction relative to the folds in the pleated filter medium, said rows of distance elements being distanced from each other along the length direction, whereby each row of distance elements is constituted of a line of glue elements distanced from each other and applied to the substantially planar faces of the filter medium;
whereby adjacent rows of distance elements are applied to the substantially planar faces on opposing sides of the filter medium, the rows of glue distance elements on the interior side being displaced in the length direction in relation to the rows of distance elements on the exterior side; and
wherein opposite ends of the filter medium are applied around a periphery of a respective end piece and sealingly attached thereto, and wherein one of the end pieces has a larger diameter than an opposite end piece so that the filter has a shape of a truncated cone.

2. The filter according to claim 1, wherein the distance elements in each row of distance elements are distanced from each other in such a way that the distance element is applied to every side of each pleat.

3. The filter according to claim 2, wherein successive rows of distance elements on the inside and the outside of the filter medium are spaced the same distance from each other in the length direction, and the rows of distance elements on the outside of the filter medium are displaced half said distance from the rows of distance elements on the inside of the filter medium.

4. The filter according to claim 3, wherein the distance elements in the rows of glue elements on the inside are displaced also in a cross direction in relation to the distance elements in the rows of distance elements on the outside.

5. The filter according to claim 1, wherein at least one continuous glue line is applied in the cross direction in one of the opposite ends of the pleated filter medium.

6. The filter according to claim 1, wherein a length of the distance elements in the cross direction is 10-80% of a width of the side of the pleat.

7. The filter according to claim 1, wherein the distance elements in each row of distance elements are distanced from each other in such a way that a distance element is applied to every second side of each pleat.

8. A filter comprising:
a pleated filter medium, wherein the pleated filter medium includes pleats with substantially planar, rectangular faces and a length direction parallel to a fold between two adjacent planar faces of each pleat, and wherein the pleated filter medium includes an interior side and an exterior side, the pleated filter medium comprising:
a first plurality of rows of distance elements extending in a cross direction relative to the folds in the pleated filter medium, wherein the first plurality of rows of distance elements are spaced apart along a length direction, and wherein the first plurality of rows of distance elements are arranged on substantially planar, rectangular surfaces on the interior side of the pleated filter medium;
a second plurality of rows of distance elements extending in a cross direction relative to the folds in the pleated filter medium, wherein the second plurality of rows of distance elements are spaced apart along a length direction, wherein the second plurality of rows of distance elements are arranged on substantially planar, rectangular surfaces on the exterior side of the pleated filter medium, and wherein rows of the first plurality of rows of distance elements are displaced in the length direction from rows of the second plurality of rows of distance elements; and
wherein each row of distance elements is constituted of a line of glue elements distanced from each other and applied to the substantially planar faces of the pleated filter medium, and opposite ends of the pleated filter medium are applied around a periphery of a respective cylindrical end piece and sealingly attached thereto, wherein one of the end pieces has a larger diameter than an opposite end piece so that the filter has a shape of a truncated cone.

9. The filter of claim 8, wherein the pleats are monolithic, substantially planar, and rectangular faces.

10. A method for constructing a pleated filter medium, comprising:
forming pleats in a filter medium, wherein the formed pleats include substantially planar, rectangular sides and a length direction parallel to a fold between two adjacent sides of each pleat, and wherein the pleated filter medium includes an interior side and an exterior side;
forming a plurality of rows of distance elements on the exterior side and the interior side of the filter medium, wherein a first plurality of the rows of distance elements extend in a cross direction relative to the folds in the filter medium, wherein the first plurality of rows of distance elements are spaced apart along a length direction, wherein the first plurality of rows of distance elements are arranged on substantially planar faces on the interior side of the filter medium, wherein the second plurality of rows of distance elements are spaced apart along the length direction, and wherein the second plurality of rows of distance elements are arranged on substantially planar faces on the exterior side of the filter medium, wherein each row of distance elements is constituted of a line of glue elements distanced from each other and applied to the substantially planar faces of the pleated filter medium and wherein rows of the first plurality of rows of distance elements are displaced in the length direction from rows of the second plurality of rows of distance elements; and
wrapping and sealing cross directional end portions of the filter medium with the formed pleats and rows of distance elements around cylindrical end pieces, wherein the cylindrical end pieces have different diameters.

11. The filter according to claim 1, wherein the substantially planar, rectangular sides are substantially free of embossments.

12. The filter according to claim 1, wherein each glue element is located on a line extending midway between a top of a pleat and a trough of the pleat.

* * * * *